(12) United States Patent
Mashimo

(10) Patent No.: US 7,496,020 B2
(45) Date of Patent: Feb. 24, 2009

(54) OPTICAL DISC APPARATUS

(75) Inventor: Akira Mashimo, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 682 days.

(21) Appl. No.: 10/241,282

(22) Filed: Sep. 10, 2002

(65) Prior Publication Data

US 2003/0053389 A1 Mar. 20, 2003

(30) Foreign Application Priority Data

Sep. 17, 2001 (JP) .............................. 2001-281081

(51) Int. Cl.
*G11B 7/00* (2006.01)
(52) U.S. Cl. .................. 369/59.11; 369/59.25
(58) Field of Classification Search .............. 369/59.11, 369/29.24, 59.25
See application file for complete search history.

(56) References Cited

U.S. PATENT DOCUMENTS

| | | | |
|---|---|---|---|
| 5,216,660 A | 6/1993 | Iimura | |
| 5,414,689 A * | 5/1995 | Maeda et al. ............. | 369/59.11 |
| 5,523,990 A * | 6/1996 | Chiba ....................... | 369/47.22 |
| 5,835,461 A * | 11/1998 | Kobayashi et al. ....... | 369/47.28 |
| 5,875,163 A * | 2/1999 | Kuroda et al. ............ | 369/47.48 |
| 6,208,603 B1 * | 3/2001 | Ishida et al. ............. | 369/59.25 |
| 6,282,159 B1 * | 8/2001 | Kimura .................... | 369/47.14 |
| 6,445,656 B1 * | 9/2002 | Koide ....................... | 369/47.28 |
| 6,552,983 B1 * | 4/2003 | Yoshida et al. ........... | 369/53.12 |
| 6,687,206 B1 | 2/2004 | Masui | |
| 6,738,328 B2 * | 5/2004 | Koide ....................... | 369/47.28 |
| 6,741,527 B2 * | 5/2004 | Okumura et al. ......... | 369/13.26 |
| 6,836,458 B2 * | 12/2004 | Adachi ..................... | 369/59.26 |
| 2002/0181362 A1 * | 12/2002 | Koide ....................... | 369/47.28 |
| 2003/0223347 A1 * | 12/2003 | Minamino et al. ....... | 369/275.3 |

FOREIGN PATENT DOCUMENTS

JP 61-168173 7/1986

(Continued)

OTHER PUBLICATIONS

JP 2001-014748 Okumura Tetsuya Jan. 19, 2001 English translation.*

(Continued)

*Primary Examiner*—Wayne R Young
*Assistant Examiner*—Van N Chow
(74) *Attorney, Agent, or Firm*—Christensen O'Connor Johnson Kindness PLLC

(57) ABSTRACT

An optical disc apparatus for recording synchronous information and data on an optical disc. The synchronous information recorded at the beginning of a frame is established to a mark in one frame in a plurality of frames. For example, the synchronous information of the mark and the synchronous information of a space are alternately established. In a frame, the synchronous information of the mark may be established, and in the subsequent frame, either the synchronous information of the mark or the synchronous information of the space may be selected so as to allow a DSV to be minimized. On the synchronous information of the mark, ROPC is executed for adjusting power of laser light.

2 Claims, 9 Drawing Sheets

FOREIGN PATENT DOCUMENTS

| | | | |
|---|---|---|---|
| JP | 4-10237 A | 1/1992 | |
| JP | 4067436 A | 3/1992 | |
| JP | 6-243471 | 9/1994 | |
| JP | 8-221908 | 8/1996 | |
| JP | 2000339694 | * | 12/2000 |
| JP | 2000339694 A | 12/2000 | |
| JP | 2001/184656 A | 7/2001 | |
| JP | 2001-266348 A | 9/2001 | |

OTHER PUBLICATIONS

Japanese Patent Office, Final Rejection for Japanese Patent Application Serial No. 2001-281081, mailed Jan. 23, 2007 (with English translation).

Japanese Patent Office, Final Rejection for Japanese Patent Application Serial No. 2001-281081, mailed May 15, 2007 (with English Translation).

* cited by examiner

OPTICAL DISC APPARATUS

BACKGROUND OF THE INVENTION

1. Field of the Invention

The present invention relates to an optical disc apparatus, and more particularly to a recordable optical disc apparatus such as a DVD-R/RW drive.

2. Description of the Related Art

In an optical disc apparatus, data is recorded while optimizing recording power through technology designated as OPC (Optimum Power Control) and ROPC (Running Optimum Power Control). Under OPC, prior to actual data recording, test data is recorded on a predetermined area (PCA: Power Calibration Area) of an optical disc while variously changing levels of recording power and the recorded test data is reproduced to select a recording power, with which reproduction signal quality (for example, β value) of the reproduced test data becomes ideal, as the optimum recording power. On the other hand, under ROPC, considering that recording film sensitivity of the optical disc is not always uniform in a plane, the amount of light returned during data recording is monitored to carry out feedback control of recording power so as to keep the amount of returned light constant when data is actually recorded under the optimum recording power determined by OPC. The amount of returned light, typically used, is the amount of light at level B, which is obtained when a pit is formed by irradiation of recording power (that is, the amount of returned light diffracted from the pit). More specifically, when the amount of returned light at level B is smaller than a fixed value, the recording power is reduced based on the determination that an excessive number of pits are formed. On the contrary, when the amount of returned light at level B is larger than the fixed value, the recording power is increased based on the determination that an adequate number of pits are not formed.

When data is recorded on an optical disc of a CD-R/RW or the like, data with pit lengths of 3T to 11T is recorded. Because it is difficult to monitor the amount of returned light in order to carry out the feedback control when the pit length is short, ROPC is carried out by detecting the amount of light returned while the longest 11T is recorded. The CD-R/RW has a standard that 11T is contained in synchronous information (SYNC) and always appears twice in a row. Because either one of the two consecutive 11T's always becomes a mark (a segment where a pit is formed by irradiation of recording power), due to the standard, it is possible to carry out ROPC using 11T at regular intervals (in other words, at the same timing as the periodically inserted synchronous information) so as to optimize the recording power at regular intervals.

For DVD-R/RW, although the pit lengths of 3T to 11T are formed just as with the CD-R or the like, there is a different standard where 14T is used as synchronous information and is not inserted twice in a row (as a pair of the mark and the space), as is the case with the CD-R, but is inserted only once. Further, in the standard, it is not specified whether 14T becomes the mark or the space. When every 14T is the space, for example, it is not possible to execute ROPC because the pit is not formed by the longest 14T, with a result that it becomes difficult to maintain recording quality due to inability to optimize the recording power at regular intervals. In order to allow ROPC to be executed, every 14T may be assigned to a mark. However, in this case where every 14T is a mark, there is a possibility that low-frequency components are increased due to the increased DSV.

SUMMARY OF THE INVENTION

It is therefore an object of the present invention to provide an optical disc apparatus capable of executing ROPC or the like by allowing a mark to appear in synchronous information.

An optical disc apparatus according to the present invention comprises recording means for recording synchronous information and data on an optical disc on a predetermined information unit basis by irradiating laser light on the optical disc, and synchronous control means for establishing the synchronous information to a mark once in a plurality of repetitions of the predetermined information unit.

In one example of an embodiment, the synchronous control means establishes the synchronous information to a mark once in two repetitions of said predetermined information unit. The synchronous information may be established to the mark once in three or four repetitions.

In another example of the embodiment, the synchronous control means establishes the synchronous information to the mark once in two repetitions of the predetermined information unit and establishes the synchronous information to a space at the other once in the two repetitions of the predetermined information unit.

In another example of the embodiment, the synchronous control means establishes the synchronous information to the mark once in two repetitions of the predetermined information unit and establishes the synchronous information to either the space or the mark at the other once in the two repetitions of the predetermined information unit so as to allow a DSV to be minimized.

As has been stated, in the optical disc apparatus of the present invention, the synchronous information is not fixedly established to the mark or the space but established to the mark once in two or more times so that the synchronous information of the mark appears at regular intervals. Because a pit is formed in a mark period, by specifying the mark as synchronous information at regular intervals, it becomes possible to adjust power of laser light by the OPC.

Although there are a variety of possible methods for establishing a mark once in two or more times, it is preferable to allocate marks and spaces so as to allow the DSV to be minimized. It is one of the methods for minimizing the DSV that the synchronous information may be alternately established to the mark and the space. By establishing the mark once in two times and selecting either the mark or the space so as to allow the DSV to be minimized at the other once in the two times, the DSV is minimized with reliability.

The present invention can be applied to any optical disc apparatuses capable of recording data such as a DVD-R drive.

The present invention will be more clearly understood by reference to the following description of the preferred embodiment. However, the scope of the present invention is not limited to the following embodiment.

DESCRIPTION OF THE PREFERRED EMBODIMENTS

Figure 1:
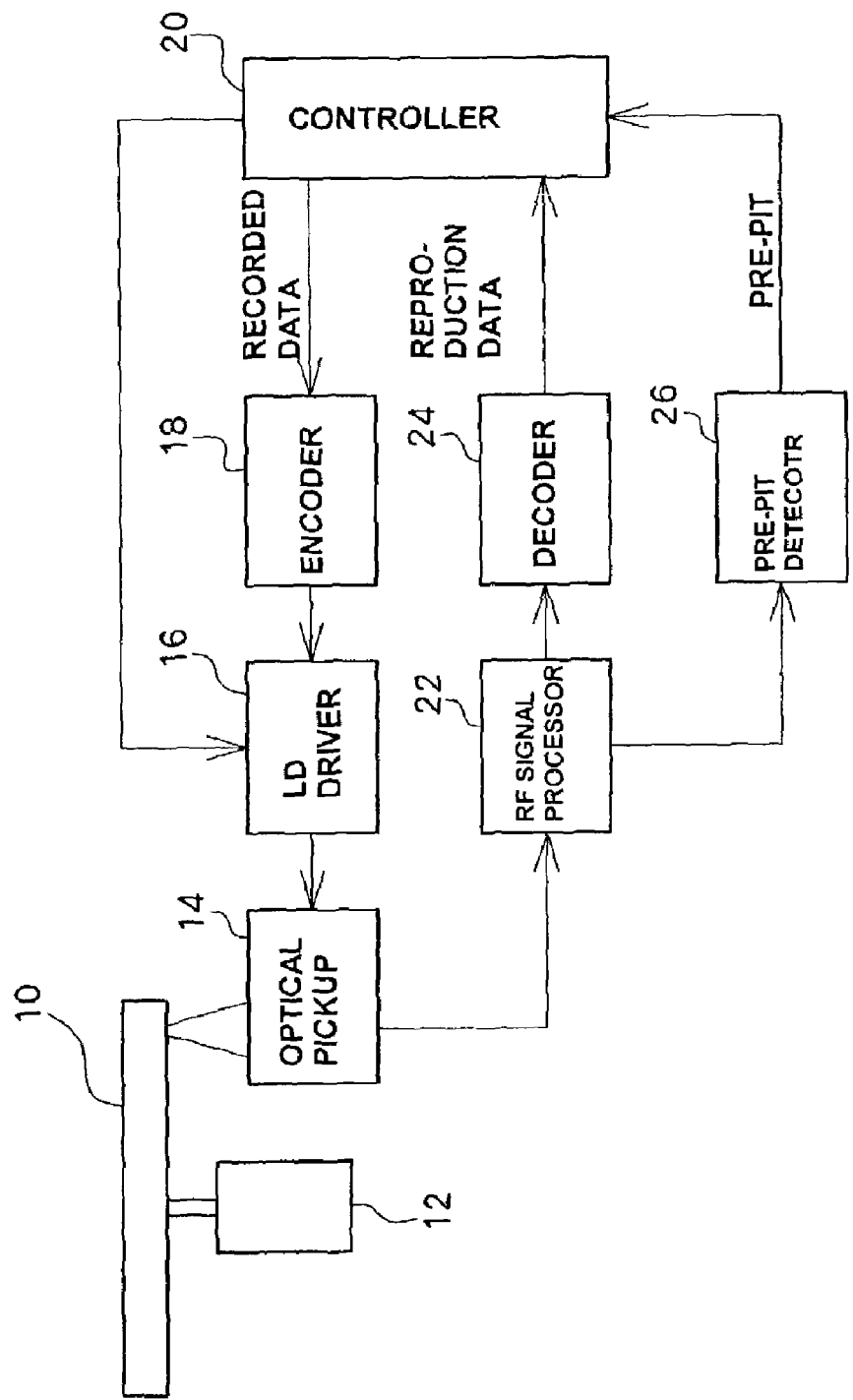
FIG. 1 is a block diagram showing a configuration of an optical disc apparatus.

Referring to the drawings, a preferred embodiment of the present invention will be described below using examples of a DVD-R drive.

FIG. 1 shows a block diagram showing a configuration of an optical disc apparatus according to the present embodiment. An optical disc (DVD-R) 10 is driven by a spindle motor 12 to be rotated at CAV (or CLV). Pre-pits (LPP: land pre-pit) are formed on areas (lands) between grooves which are information recording tracks of the optical disc 10 at established intervals. Locations on the surface of the optical disc 10 (addresses) can be identified by detecting the pre-pits.

An optical pickup 14 located so as to be opposed to the optical disc 10 irradiates laser light at recording power to the optical disc 10 to record data and irradiates laser light at reproducing power to replay recorded data. At the time of recording, recorded data obtained from a controller 20 is modulated by an encoder 18 and converted to a driving signal at a LD driver 16 so as to drive laser diodes (LD) of the optical pickup 14. At the time of reproduction, the amount of returned light which is converted to an electric signal at the optical pickup 14 is provided to an RF signal processor 22 and passed to the controller 20 as reproduction data after demodulation at a decoder 24.

The RF signal processor 22 comprising an amplifier, an equalizer, a binarization unit and a PLL section boosts and binarizes an RF signal, and then generates a synchronous clock to output to the decoder 24. A reproduction RF signal is also provided to a pre-pit detector 26.

The pre-pit detector 26 detects signal components of pre-pits LLP formed on lands each adjoining to a groove (lands each adjoining to the outer rim side of the groove) and sends the detected signal components to the controller 20.

The controller 20 comprising a microcomputer or the like provides the encoder 18 with the recorded data as well as pre-pit detection information. The encoder 18 modulates the recorded data and provides the LD driver 16 with a data signal in which synchronous information is inserted at regular intervals based on the pre-pit detection information. Details of the encoder 18 will be described later.

In addition to the above-described components, a servo system for generating focus error and tracking error signals to control focusing and tracking by a focus servo and a tracking servo is used. Because the servo system is equal to a conventional drive, it is not described. Regarding write strategies for recording data, the write strategy which has already been publicly known may be utilized. That is, laser light at recording power is established by laminating recording pulses on a reproduction level. Further, a single pit is formed not by a single recording pulse but a plurality of recording pulses (multi-pulses) for recording. More specifically, 3T is recorded by one pulse and 4T and larger (including 14T) are recorded by multi-pulses.

In the optical disc apparatus according to the present embodiment, recording power is also optimized by executing OPC and ROPC. More specifically, prior to recording, the controller 20 provides the encoder 18 with test data which is recorded on a PCA of the optical disc 10 with variously changed levels of the recording power. Then, the recorded test data is reproduced under reproducing power. After selecting the optimum recording power based on a β value or the like in the reproduction RF signal obtained at the time of reproducing the test data, data is recorded under the selected optimum recording power. Further, the controller 20 periodically detects the amount of returned light during data recording to determine whether or not a value at level B in the amount of returned light matches with a predefined constant value stored in a memory. When they are not matched, the recording power is increased or decreased depending on which value is larger by controlling the LD driver 16. The ROPC according to the present embodiment is executed when a pit length of 14T contained in synchronous information is formed (executed to the mark) and encoding at the encoder 18 is performed so as to make the mark 14T appear in the synchronous information at regular intervals.

Figure 2:
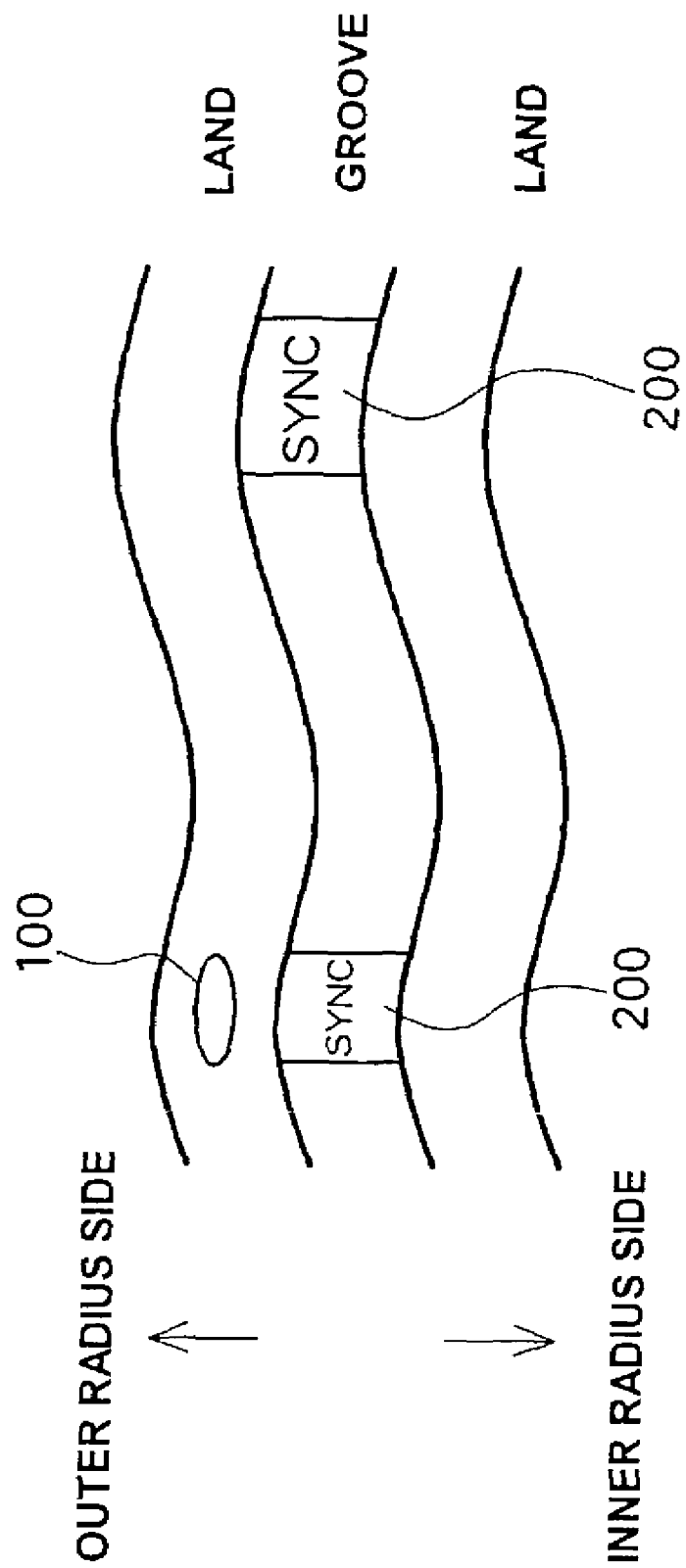
FIG. 2 is an explanatory drawing representing relationships among a land, a groove, a pre-pit and synchronous information.

Referring to FIG. 2, a recording mode of the optical disc 10 according to the present embodiment is schematically depicted. In the optical disc 10, pre-pits LLP 100 are formed at established intervals on lands, or areas between grooves. Data to be recorded on the grooves is divided by an information unit of a SYNC frame beforehand. A single sector consists of twenty-six SYNC frames and one ECC block consists of sixteen sectors. Synchronous information (SYNC) 200 is inserted at the beginning of each SYNC frame for synchronization between the SYNC frames. In order to ensure the synchronization between the SYNC frames, 14T which is sufficiently longer than the longest 11T among those which appear in data modulating sections is used as the synchronous information SYNC. By DVD-R standards, either a mark or a space may be selected to a SYNC pulse of 14T. Accordingly, the encoder 18 according to the present embodiment selects SYNC data of 14T based on a predetermined rule and inserts the selected SYNC data in a data string so as to make the mark periodically appear once in two or more times.

The grooves shown in FIG. 2 are wobbled (waved) at an established frequency. The number of rotations of the optical disc 10 can therefore be determined by detecting the wobble frequency.

Figure 3:
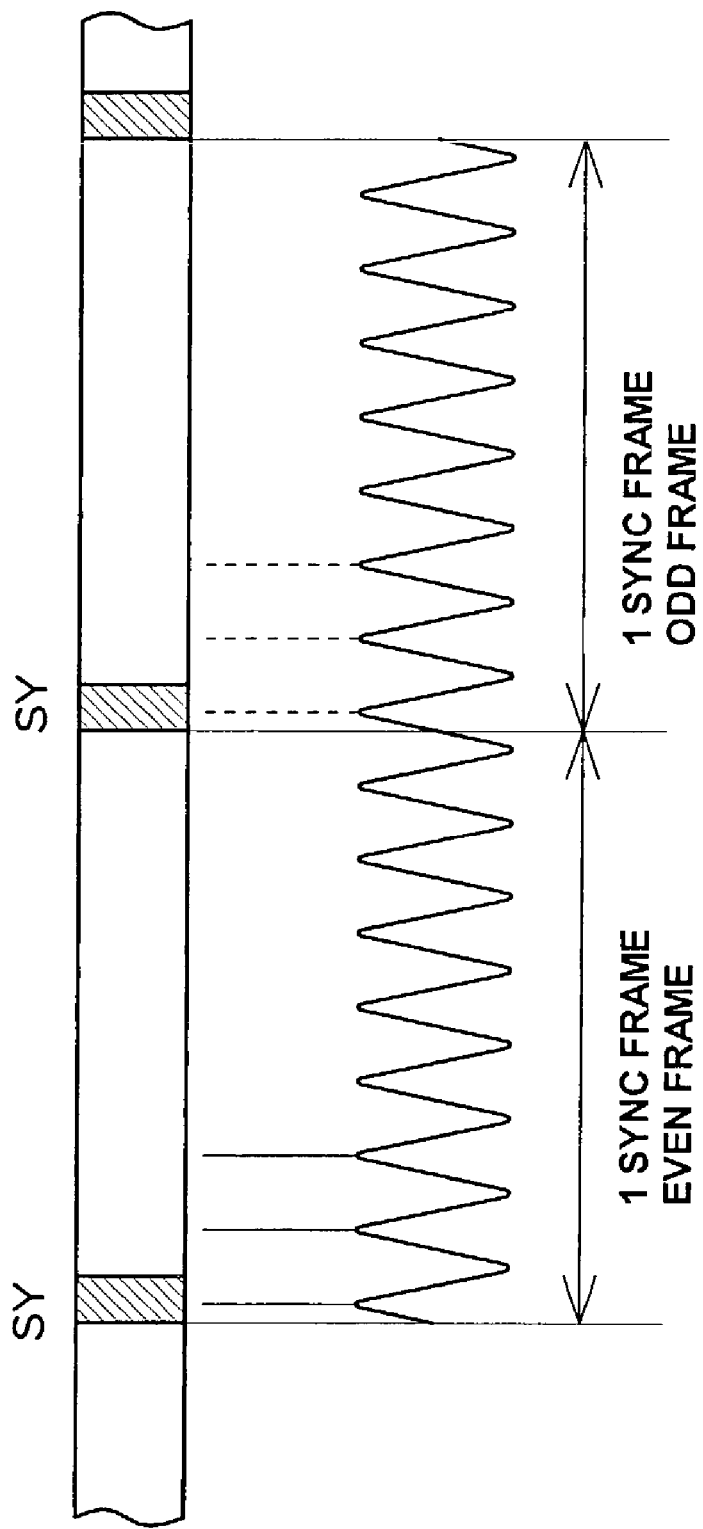
FIG. 3 is an explanatory drawing showing a relationship between synchronous frames and synchronous information.

FIG. 3 schematically shows relationships among the SYNC frames, the synchronous information (SY) and the pre-pits. The SYNC frames are broadly categorized into even frames and odd frames. Although the pre-pits are usually formed corresponding to the even frames, they are shifted and located on the odd frames to avoid interference such that two pre-pit components are mixed in the returned light when the pre-pits are formed at almost the same location on both lands adjoining to the groove to be recorded. The wobble frequency is eight times the frequency of the SYNC frame. The pre-pits are positioned on the first three peaks of wobble in one SYNC frame and the first pre-pit in the SYNC frame becomes a SYNC pre-pit indicating a synchronous position. By detecting the SYNC pre-pit from the reproduction signal, it becomes possible to identify the synchronous position. Then, the optical disc apparatus records data after assigning 14T of the synchronous information (SYNC data) to the identified synchronous position.

A configuration and processes of the encoder 18 will be described below.

Figure 4:
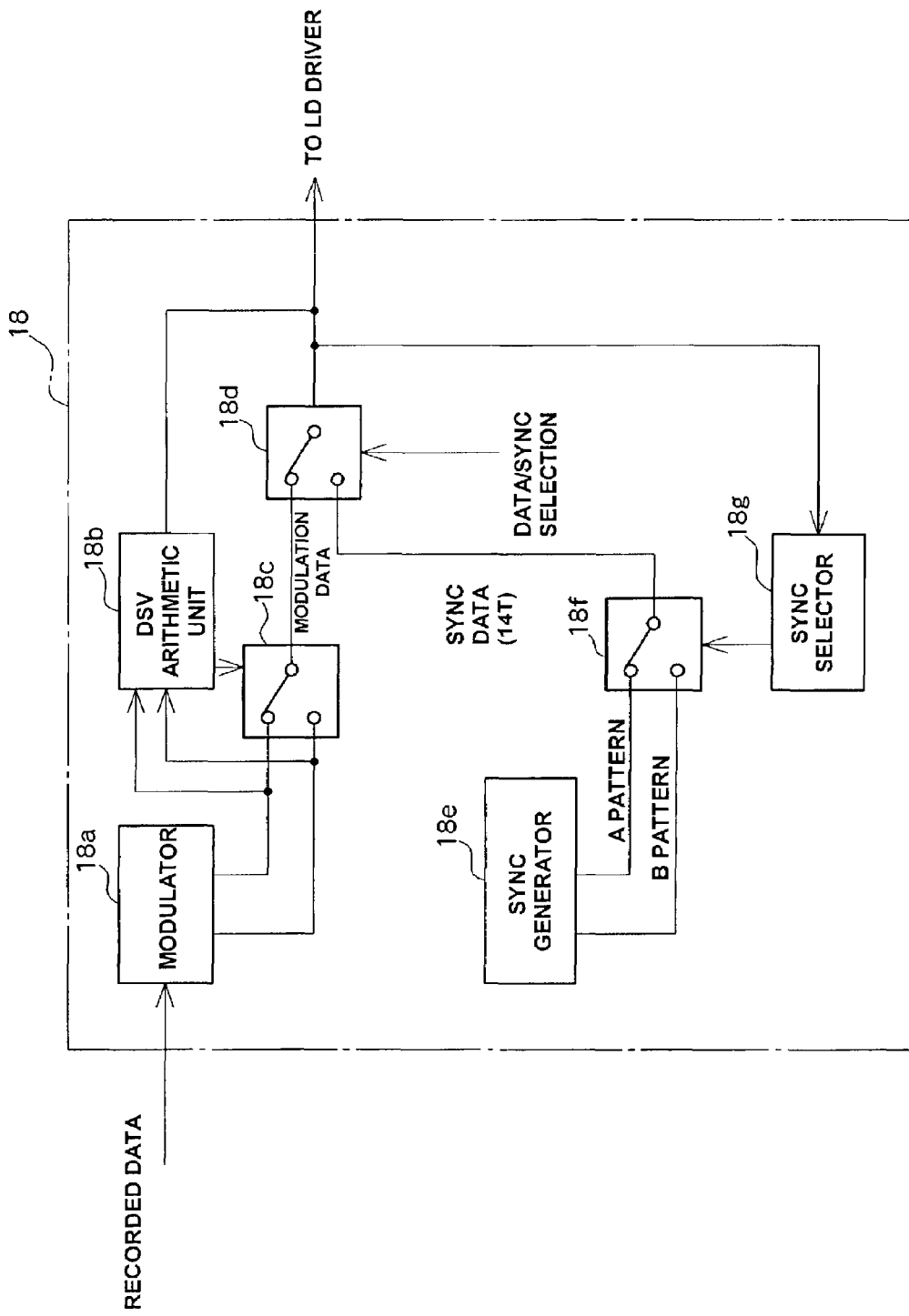
FIG. 4 is a block diagram showing a configuration of an encoder indicated in FIG. 1.

FIG. 4 shows a block diagram representing functional details in the encoder 18 of FIG. 1. The encoder 18 comprises a modulator 18a, a DSV arithmetic unit 18b, a SYNC generator 18e, a SYNC selector 18g and selection switches 18c, 18d and 18f.

The modulator 18a performs 8/16 modulation of the recorded data received from the controller 20, generates 3T to 11T signals and sends the generated signals to the selection switch 18c. More specifically, the modulator 18a generates 2 types of data (main modulation data and sub modulation data) based on the recorded data to provide them to the selection switch 18c. The two types of modulation data are generated for the purpose of allowing selection of modulation data which yields the minimum DSV in the DSV arithmetic unit 18b to be made.

The DSV arithmetic unit 18b finds the modulation data which is provided to the LD driver 16. More specifically, the DSV of data recorded on the optical disc 10 is calculated to select the modulation data based on the calculation result by supplying a selection signal to the selection switch 18c. It should be noted that a DSV (Digital Sum Value) is a value obtained by accumulating all the figures from the beginning of a bit string, which consists of two types of status, taking one status of the bit string (for example 1) as +1 and the other status of the bit string (for example 0) as −1. When an absolute value of the DSV is small, a low frequency component (direct current component) is small. Accordingly, the small absolute value means that the low frequency component is sufficiently suppressed to improve recording/reproduction quality. The modulation data selected by the selection switch 18c based on the DSV is then provided to the selection switch 18d.

The selection switch 18d is a switch for toggling between the modulation data and the SYNC data and it is switched according to the pre-pit detection data (data/SYNC selection data) and a clock from the controller 20. In other words, the selection switch 18d is toggled to a SYNC data side for output when the pre-pit detection data is obtained from the controller (at the even frame) and a predetermined clock is counted from the pre-pit detection data (at the odd frame), these are a timing of inserting SYNC data as the synchronous information. At all the other times, the selection switch 18d is toggled to a side of the modulation data provided from the selection switch 18c for output to the LD driver 16. This switching allows the SYNC data to be inserted at the synchronous location.

The SYNC generator 18e for generating a SYNC pattern of 14T produces two patterns comprising a pattern A in which 14T becomes the mark (pattern A) and a pattern B in which 14T becomes the space, and provides the generated patterns to the selection switch 18f.

The selection switch 18f is a switch for selecting either the pattern A (mark) or the pattern B (space). This selection is controlled by the SYNC selector 18g in such a manner that the selection switch 18f periodically selects the mark once in two or more consecutive times. More specifically, the selection switch 18f is toggled in alternate order such as mark->space ->Mark->space-> . . . so as to periodically select the mark once in two times. The SYNC data received from the selection switch 18f is provided to the above-described selection switch 18d and inserted at the synchronous position.

Figure 5:
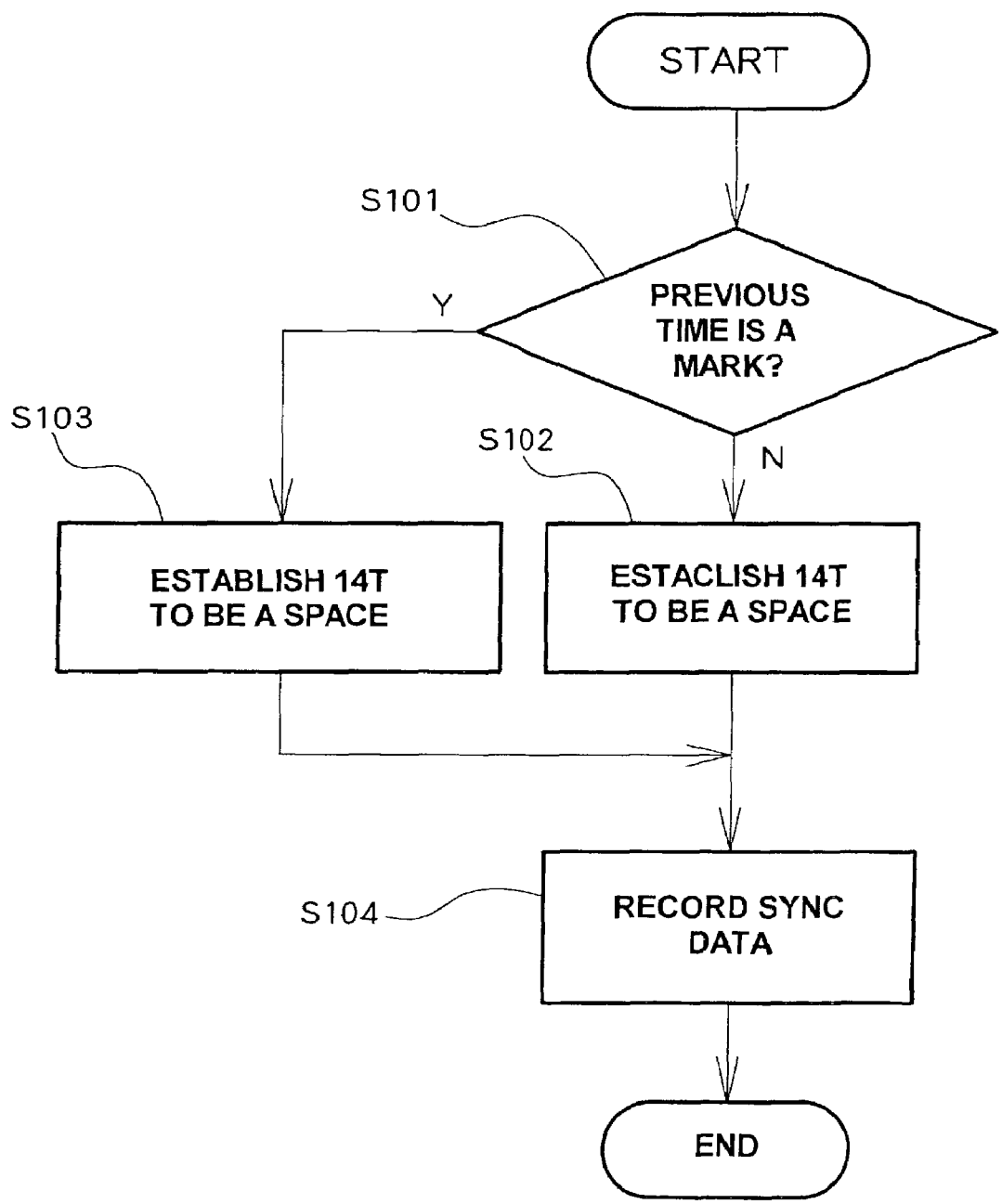
FIG. 5 is a flowchart of a process for establishing synchronous information.

Referring to FIG. 5 showing a flowchart of a process of the SYNC selector 18g in the encoder 18, the SYNC data inserted at the previous time is determined whether or not it is a mark, first. The determination may be made by judging the current status of a flag toggled between 0 and 1 in a memory which is overwritten, for example, by switching the flag to 1 in a case of the mark and to 0 in a case of the space. Next, when the previous SYNC date is determined as the space (when NO is selected at S101), the selection switch 18f is switched so as to allow the SYNC data, which should be inserted this time, to become the mark (S102). On the other hand, when the previous SYNC date is determined as the mark, the selection switch 18f is switched so as to allow the SYNC data, which should be inserted this time, to become the space (S103). As described above, the SYNC data is recorded on the optical disc 10 while selecting the mark and the space alternately (S104).

Figure 6:
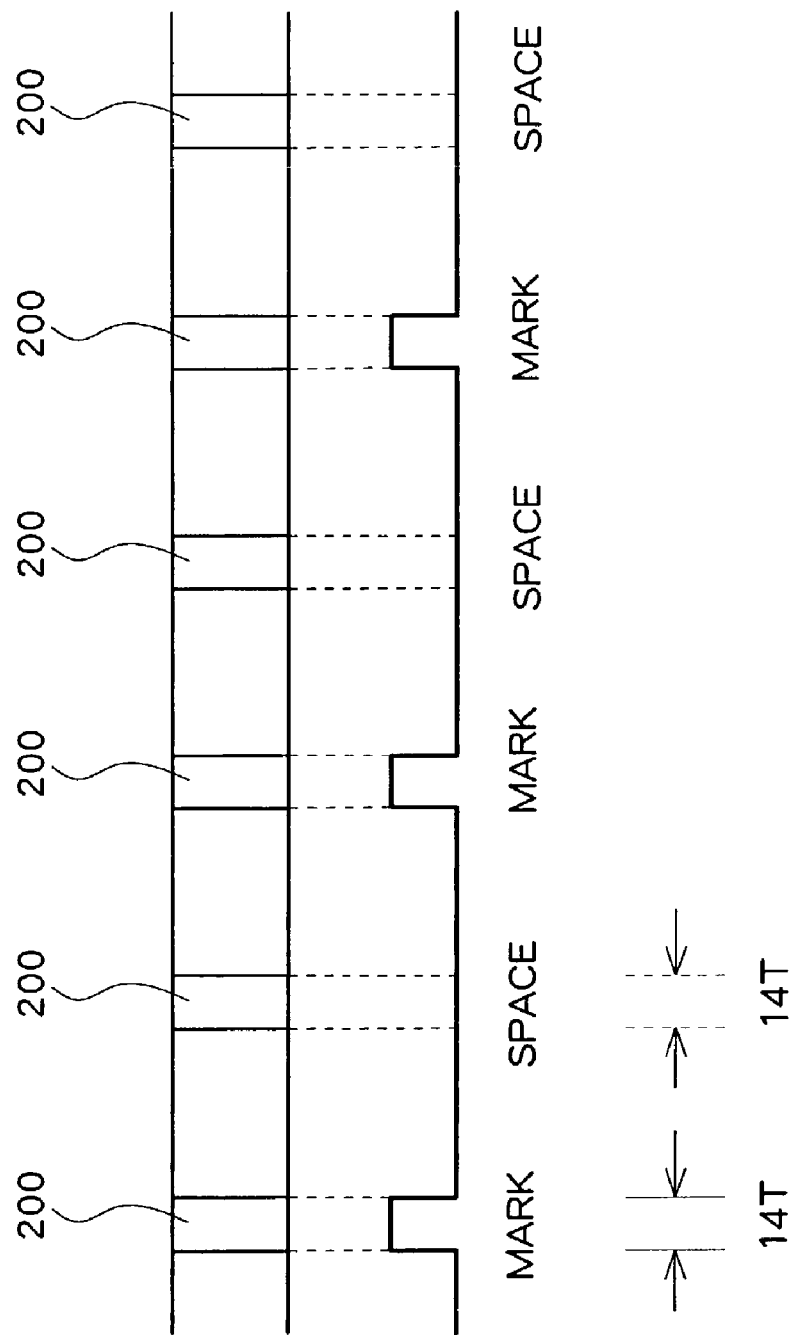
FIG. 6 is a drawing explaining a pattern of synchronous information.

FIG. 6 schematically shows the synchronous information recorded on the grooves according to the present embodiment. The synchronous information 200 is set in each of the SYNC frames and either the mark or the space is alternately allocated to the SYNC data. Accordingly, the mark appears once in the consecutive two times, in other words, the mark of 14T appears at an interval which is twice as long as the interval of occurrence of the synchronous information. At this timing of occurrence of the mark, ROPC can be carried out. The timing of executing ROPC may be determined by, for example, providing the selection signal from the SYNC selector 18g in the encoder 18 to the controller 20 which executes the ROPC based on the signal.

In this embodiment, either the mark or the space may be fixedly used as the first SYNC data. For example, when the space is always used for the first SYNC data, the order is space ->mark ->space -> . . . .

Figure 7:
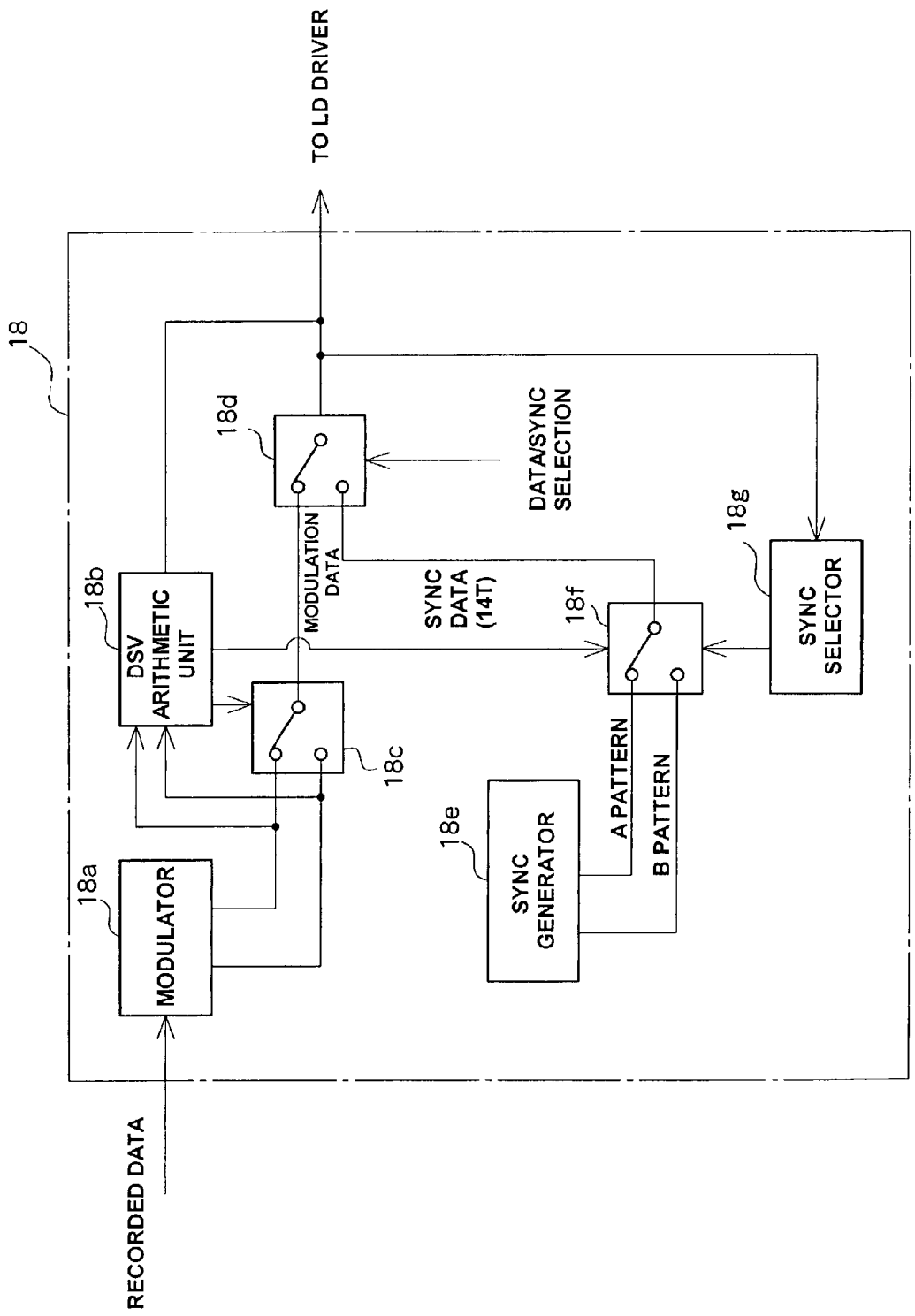
FIG. 7 is a block diagram showing another configuration of the encoder indicated in FIG. 1.

FIG. 7 shows another block diagram representing functional details in the encoder 18. The encoder 18, comprising the modulator 18a, the DSV arithmetic unit 18b, the SYNC generator 18e, the SYNC selector 18g and the selection switches 18c, 18d and 18f, selects a pattern from which the smaller DSV is calculated among the two patterns provided from the modulator 18a for output, and inserts the SYNC data at the synchronous timing by toggling the selection switch 18d, as in the case of the block diagram shown in FIG. 4.

In contrast to FIG. 4, the selection signal provided to the selection switch 18c based on the DSV calculated in the DSV arithmetic unit 18b is also provided to the selection switch 18f. More specifically, in FIG. 4, the SYNC selector 18g selects the mark and the space alternately. In FIG. 7, on the other hand, the SYNC selector 18g selects the mark once in two times and selects either the mark or the space so as to allow the DSV to be minimized at the other one occasion in the two times, instead of exclusively selecting the space.

Figure 8:
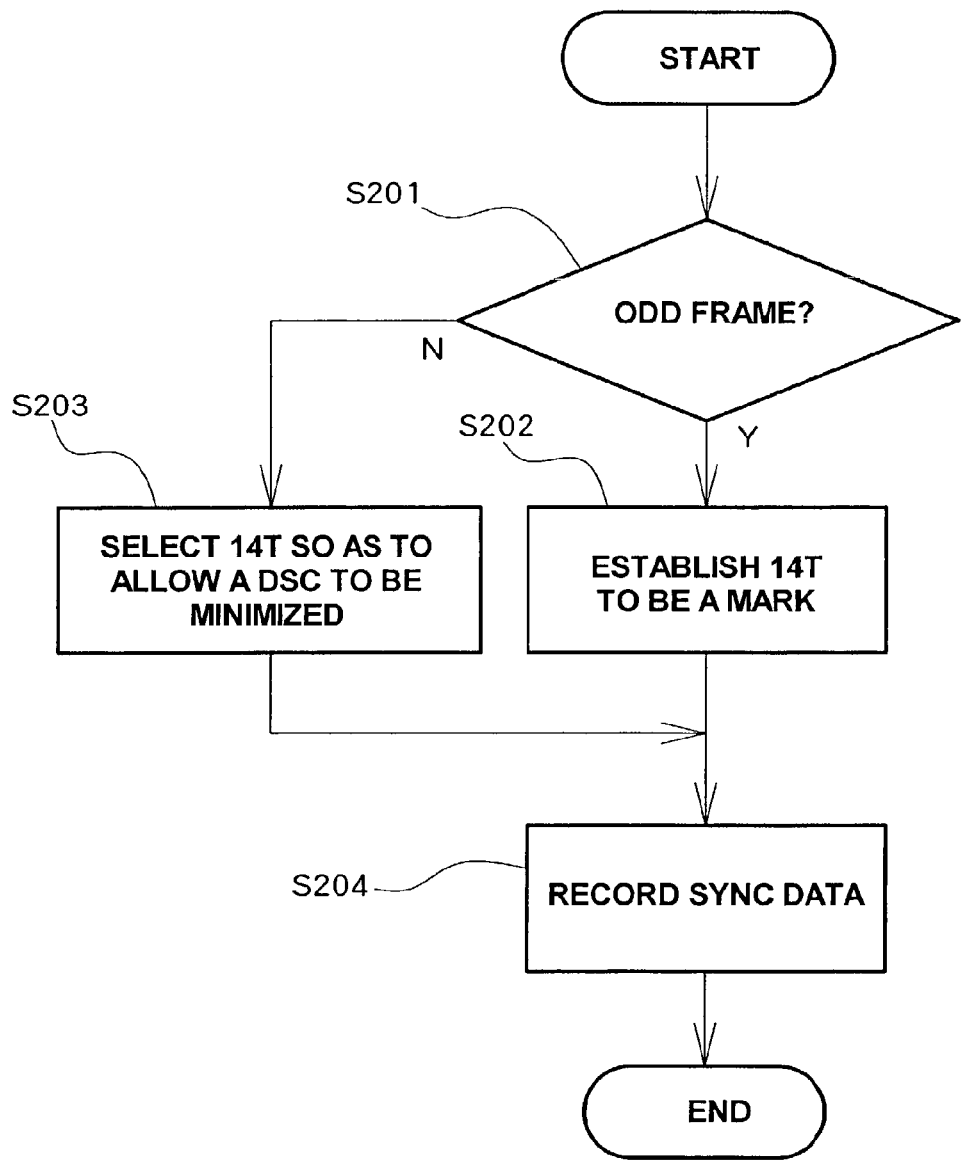
FIG. 8 is another flowchart of the process for establishing synchronous information.

Referring to FIG. 8 showing a flowchart of a process, it is determined whether or not the current SYNC flame is an odd frame, first (S201). The determination as to whether or not to be the odd frame may be made by detecting the presence or absence of the pre-pit (as described above, the pre-pit is basically located at the beginning of the even frames). When the current SYNC frame is determined as the odd frame, the SYNC data is permanently set to be the mark by switch controlling in the SYNC selector 18g (S202). As a result, it becomes possible to ensure that the SYNC data becomes the mark once in two times. On the other hand, when the current SYNC frame is not the odd frame, i.e. when it is an even frame, either the mark or the space is selected for the SYNC data so as to be capable of obtaining the minimum DSV (S203). For example, if an absolute value of the DSV is increased by allocating the space to the current even frame, the mark is selected for the SYNC data instead of the space. This selection results in the mark consecutively appearing three times in total including both prior and subsequent odd frames. After selecting the SYNC data as has been described, the SYNC data is recorded on the optical disk 10 (S204).

Figure 9:
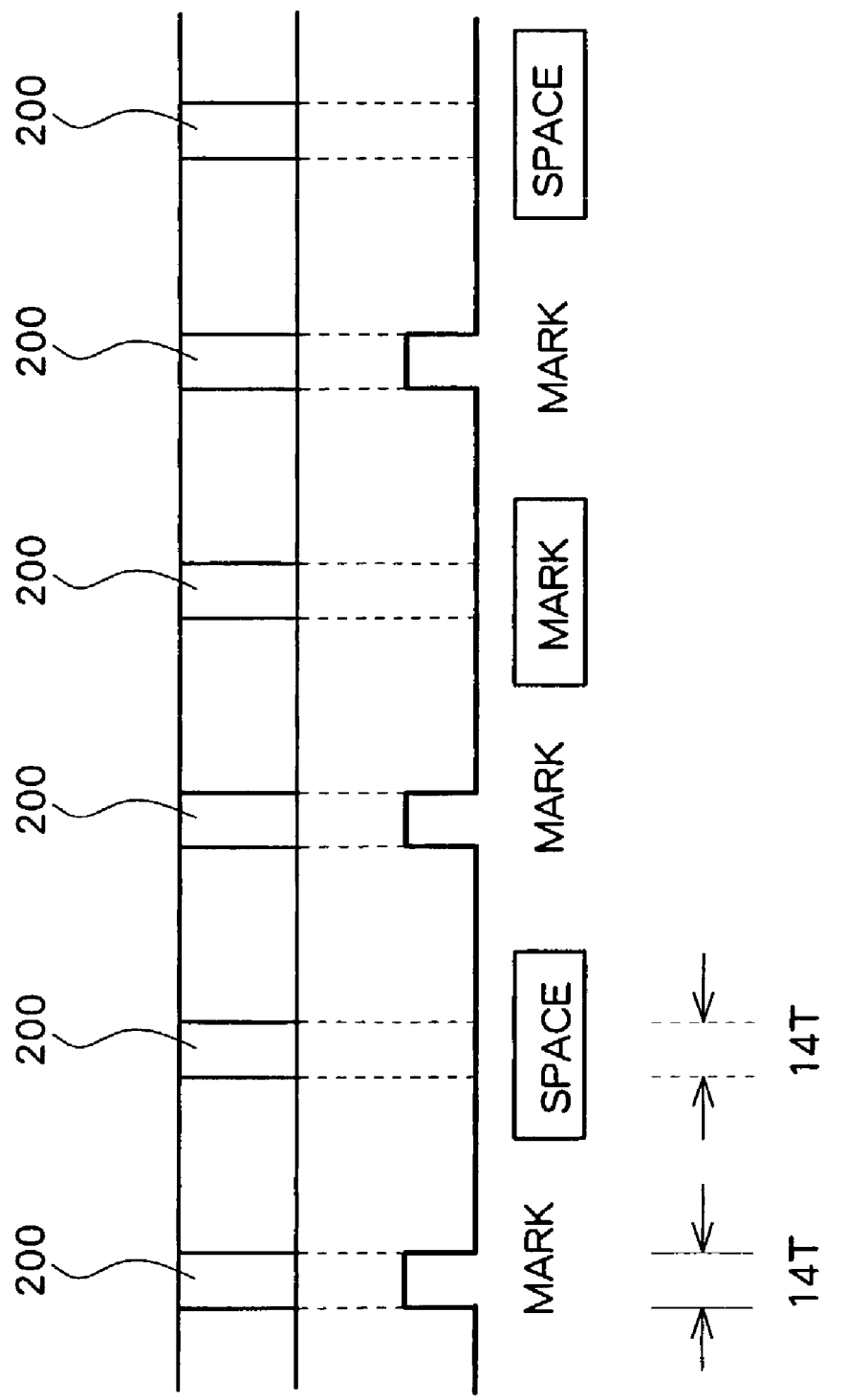
FIG. 9 is a drawing explaining another pattern of synchronous information.

FIG. 9 schematically shows a recording pattern of the synchronous information according to the present embodiment. Each box around a letter drawn in the figure means that the boxed area is selected on the basis of the DSV (the even frame). Although every odd frame is the mark, each of the even frames is selectively determined to be either the mark or the space according to the DSV. Accordingly, the mark can appear three or more times in a row under certain circumstances. Because the mark periodically appears once in two times in this embodiment, it is possible to execute ROPC periodically at mark positions. Further, because the mark and the space are selectively located based on the DSV instead of locating them in alternate order, the absolute value of the DSV can be minimized with reliability.

Although a preferred embodiment of the present invention has been described, it is to be understood that the present invention is not limited to the specific embodiment thereof and changes and variations may be made without departing from the spirit or scope of the invention.

For example, selection of 14T becoming the mark is made once in two times in the present embodiment. In some instances, it is also possible to make the selection once in three times. Because the need for executing ROPC is high especially in an area at the outer radius of the disc, it is preferable that while the mark is allocated once in three times in an area at the inner radius of the disc, the mark is allocated once in two times in the area at the outer radius of the disc. Alternatively it is also preferable that while the space and the mark is allocated in alternate order in the area at the inner radius, the mark is regularly allocated once in two times and either the mark or the space is selected based on the DSV at the other once in the two times in the area at the outer radius. Although it is not necessary to make a selection between the mark and the space based on a consistent rule applied over the disc, it is essential only that the mark is selected once in two or more times so that the mark appears periodically.

Further in the present embodiment, when either the mark or the space is selected in alternate order, it is possible to allocate the mark to every even frame and allocate the space to every odd frame and vice versa. However, it is more preferable that every odd frame be the mark because each of the even frames basically has the pre-pit causing noise during ROPC.

It is also possible to regularly allocate the mark once in two times and allocate either the mark or the space on a random basis at the other one occasion in the two times.

Although an example in which the pre-pit is formed on the adjacent land has been described in the embodiment, it is further possible to apply the present invention in a similar manner to optical discs, on which the land is not formed, of DVD+R, DVD+RW, DVD+RAM and so on.

What is claimed is:

1. An optical disc apparatus comprising:
an optical pickup for irradiating laser light to an optical disc to record synchronous information and data on a frame basis, receiving light returned from said optical disc and outputting a returned light signal;
a driver for adjusting power of said laser light based on a level of the returned light signal from said optical pickup; and
an encoder for providing said synchronous information and data to said optical pickup, the encoder toggling between a mark and a space as said synchronous information and providing either the mark or the space, wherein
said encoder provides said synchronous information in such a manner that the synchronous information becomes a mark in one frame in a plurality of frames at regular intervals,
said driver adjusts power of said laser light based on said mark in the one frame of a plurality of frames at a timing of recording said synchronous information of the mark, wherein said synchronous information is formed only by marks or only by spaces, and
wherein said encoder comprises:
a modulator for modulating data to be recorded;
a sync generator for generating synchronous information;
a first switch for selectively outputting the synchronous information of the mark from among said synchronous information from said synchronous generator at a timing such that the synchronous information of the mark appears in one frame in a plurality of consecutive frames; and
a second switch, in which the synchronous information from said first switch and modulation data from said modulator are inputted, for toggling between the synchronous information and the modulation data and outputting either the synchronous information or the modulation data.

2. An optical disc apparatus according to claim 1, wherein said first switch alternately selects the synchronous information of the mark and the synchronous information of the space from among the synchronous information from said sync generator on a frame basis and outputs the selected synchronous information.

* * * * *